UNITED STATES PATENT OFFICE.

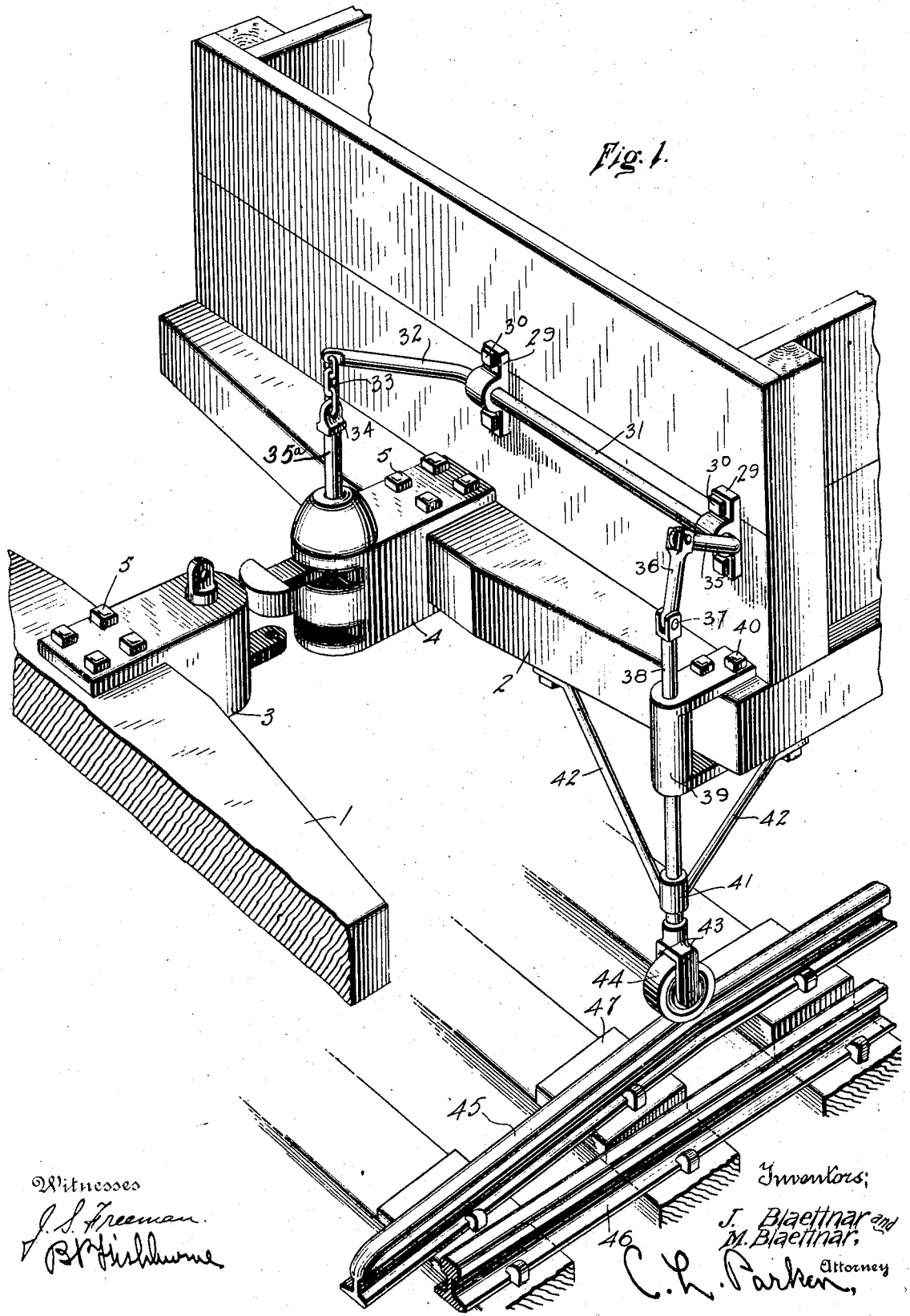

MICHAEL BLAETTNAR AND JOHN BLAETTNAR, OF POMEROY, OHIO.

CAR-COUPLING.

1,028,531.

Specification of Letters Patent. Patented June 4, 1912.

Application filed February 26, 1910. Serial No. 546,085.

*To all whom it may concern:*

Be it known that we, MICHAEL BLAETTNAR and JOHN BLAETTNAR, citizens of the United States, residing at Pomeroy, in the county of Meigs and State of Ohio, have invented certain new and useful Improvements in Car-Couplings, of which the following is a specification.

Our invention relates to new and useful improvements in car couplings.

An important object of this invention is to provide a device of the above character which will automatically couple and uncouple cars.

Our improved coupling device may be applied to any form of car, but the same is particularly useful in connection with cars employed for transporting coal or the like from a mine to a dump. By the employment of our coupling a car may be run upon a side track and cut loose from the engine or another car without stopping said engine or manually operating the coupling. This results in the saving of time and labor, whereby the cost of transportation is reduced.

Our invention consists generally in the combination with a coupling of automatic means for operating the same.

In the accompanying drawing forming a part of this specification the figure is a perspective view of the coupling and associated members.

In the drawings illustrating a preferred embodiment of our invention, the numerals 1 and 2 designate as a whole, cars, which are equipped with the coupling. The coupling comprises coöperating draw-heads 3 and 4, which have their inner ends bifurcated for the reception of portions of the cars 1 and 2, to which said bifurcated ends are rigidly secured by means of bolts 5 or the like.

Arranged upon one end of the car 2 are spaced brackets 29 which are in horizontal alinement and secured to the car by means of bolts 30 or the like. These brackets support a rock shaft 31, the inner end of which is bent to form a crank 32, to the end of which is secured a chain 33 which is also connected to the upper apertured head 34 of a coupling pin 35ª. The outer end of the rock shaft 31 is bent to form a crank 35 to which is pivotally connected the upper end of a link 36, the lower end of which is pivotally connected as at 37 to a push-rod 38. This push-rod is vertically disposed and slidably mounted within a bracket 39 which is rigidly connected to the end of the car 2 near one side thereof, by means of bolts 40. The rod 38 is further slidably mounted through a collar 41, which is rigidly connected to the car 2 by means of diagonally arranged rods 42. The push rod 38 carries upon its lower end a yoke 43 between the spaced sides of which is rotatably mounted a wheel 44 as shown in Fig. 1. This wheel 44 is designed to engage a supplemental rail 45, which is arranged inwardly of the track rail 46 and elevated above the same by virtue of its being arranged upon blocks 47. The supplemental rail is inclined upwardly from its ends toward its center, whereby the push-rod is gradually elevated.

Attention is called to the fact that the vertically movable pin 21 besides from fulfilling its ordinary function, serves the additional function of returning the push rod 38 to its normal lowermost position, in case the push rod should be raised accidentally. It will thus be seen that the pin 35ª is a gravity operated element, which must be in its lowermost position when the cars are coupled, and which serves to return the push rod to its lowermost position.

In the operation of the coupling mechanism, assuming that the draw-heads 3 and 4 are connected or coupled, the cars 1 and 2 are then drawn along the track until the supplemental rail 45 is reached. The rod 38 is then forced upwardly and by means of the connecting link 36 actuates the rock shaft 31 whereby the crank 32 is oscillated upwardly to elevate the coupling pin 35ª.

Having fully described our invention what we claim is:

The combination with a car having an end extending base, of a draw-head connected therewith, a gravity operated pin having engagement with the draw-head, a vertical sleeve having at its opposite ends spaced wings fitting on the upper and lower faces of the end extending base, means rigidly connecting said wings with the end extending base, a lower sleeve, angle braces connected with the lower sleeve and the car, a reciprocatory push rod extending through the sleeves, a fork carried at the lower end of the push rod, a wheel carried by the fork, a vertically longitudinally curved rail to elevate the wheel, a horizontal rock-shaft provided at its ends with cranks of different lengths, brackets fixed to the car and receiving the rock-shaft, a link connecting the upper end of the push-rod upon the short crank, and a flexible member connecting the long crank with the gravity operated pin.

In testimony whereof we affix our signatures in presence of two witnesses.

MICHAEL BLAETTNAR.
JOHN BLAETTNAR.

Witnesses:
J. P. BRADBURY,
A. D. RUSSELL.